(No Model.) 3 Sheets—Sheet 2.
W. H. SWIFT.
CONDUIT ELECTRIC RAILWAY.
No. 531,450. Patented Dec. 25, 1894.
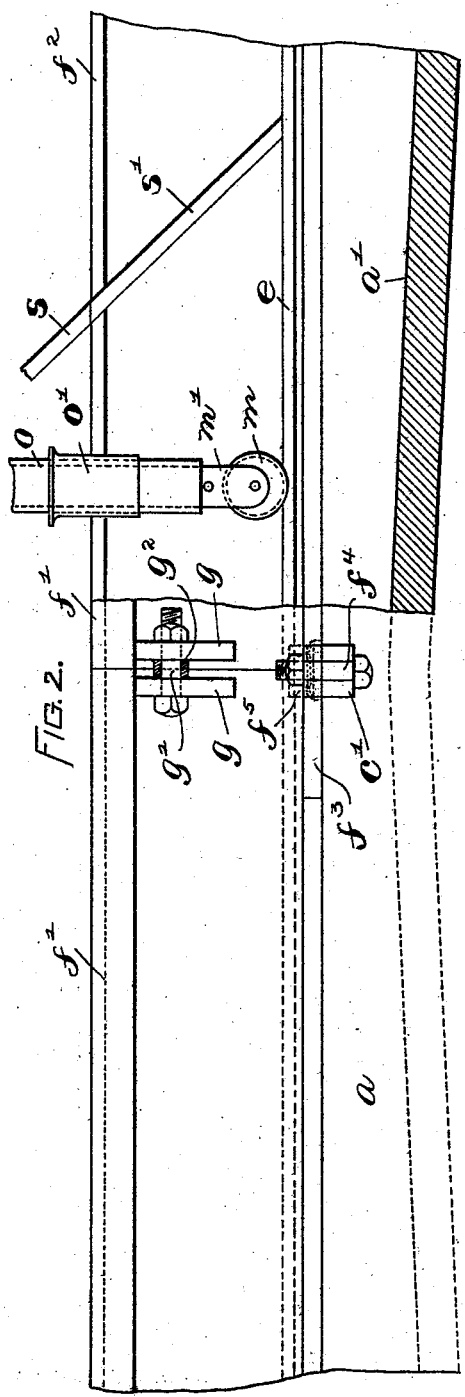
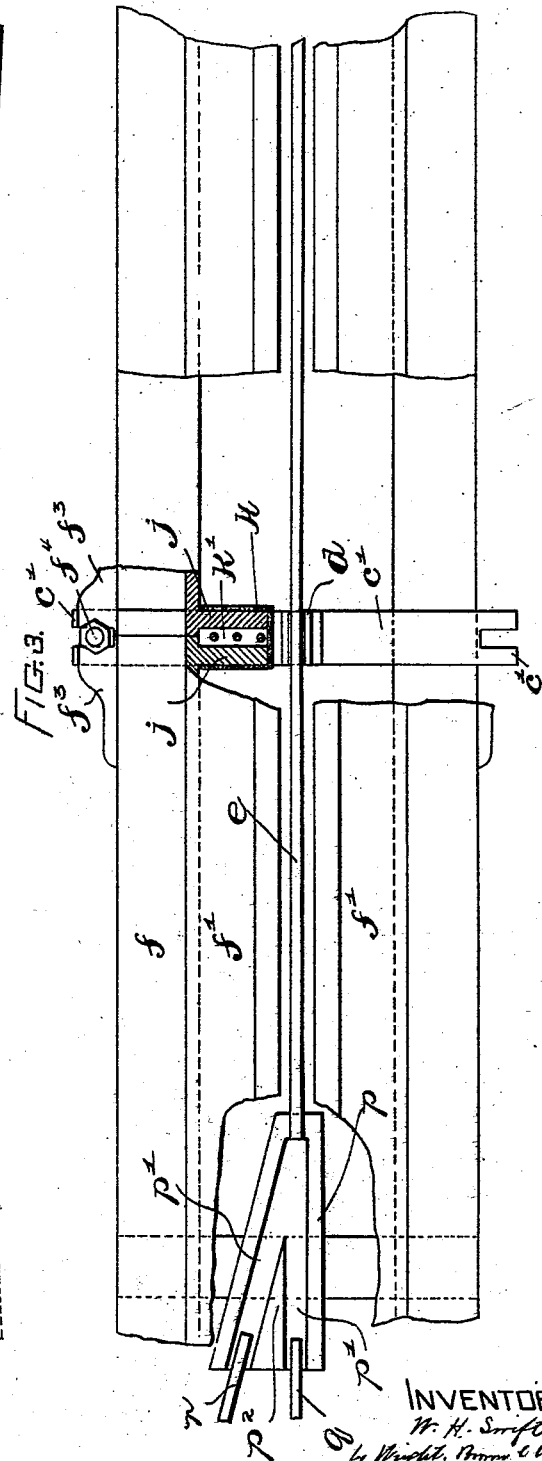
WITNESSES:
INVENTOR:

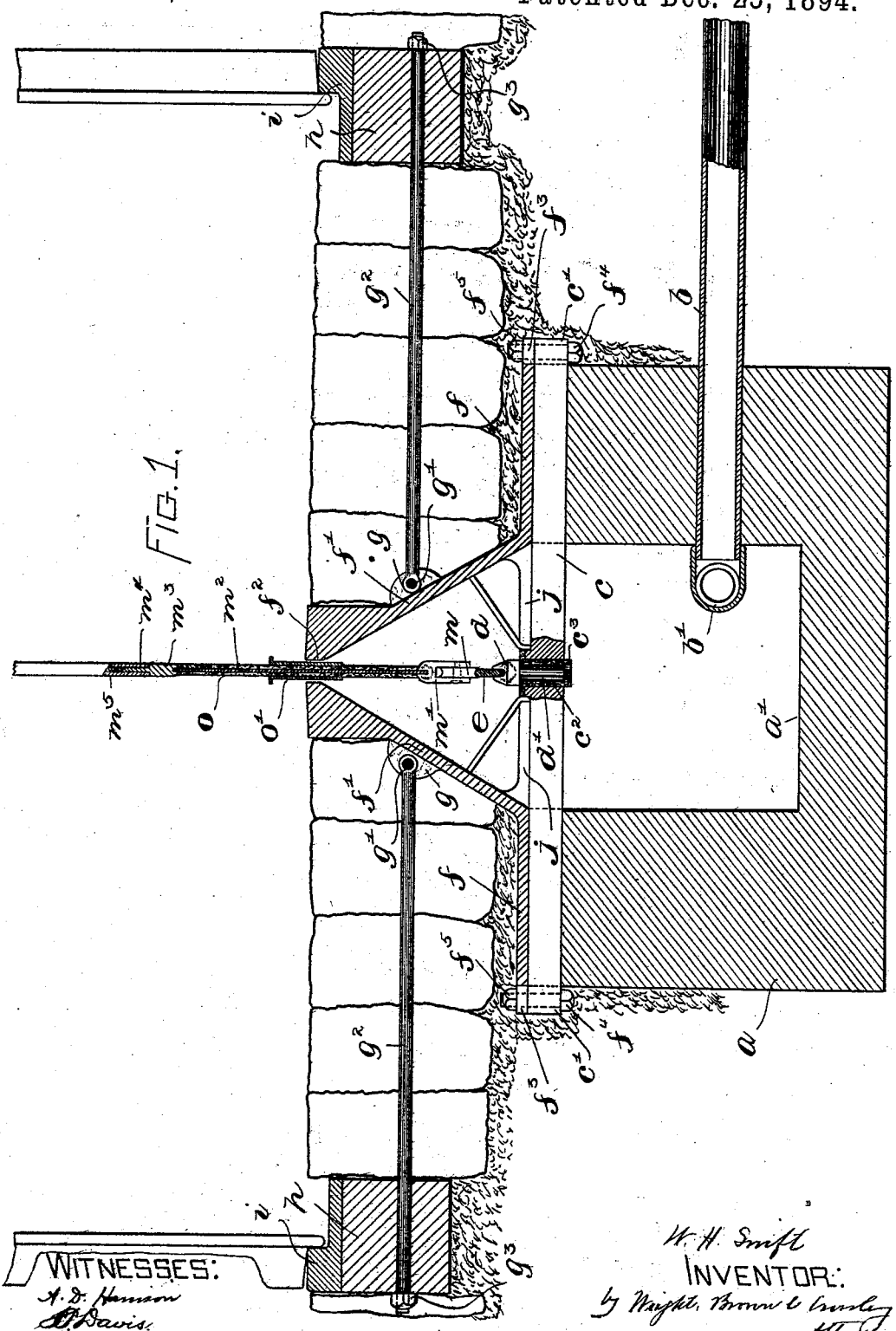

(No Model.) 3 Sheets—Sheet 3.
W. H. SWIFT.
CONDUIT ELECTRIC RAILWAY.
No. 531,450. Patented Dec. 25, 1894.
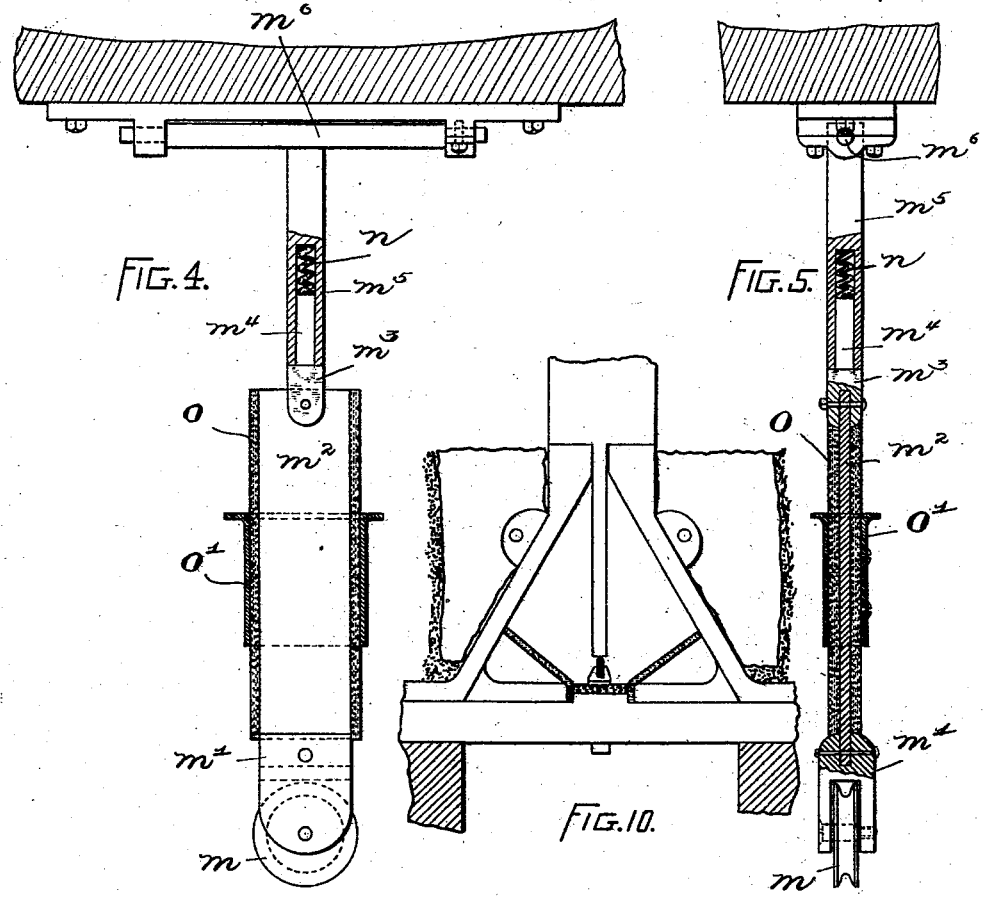
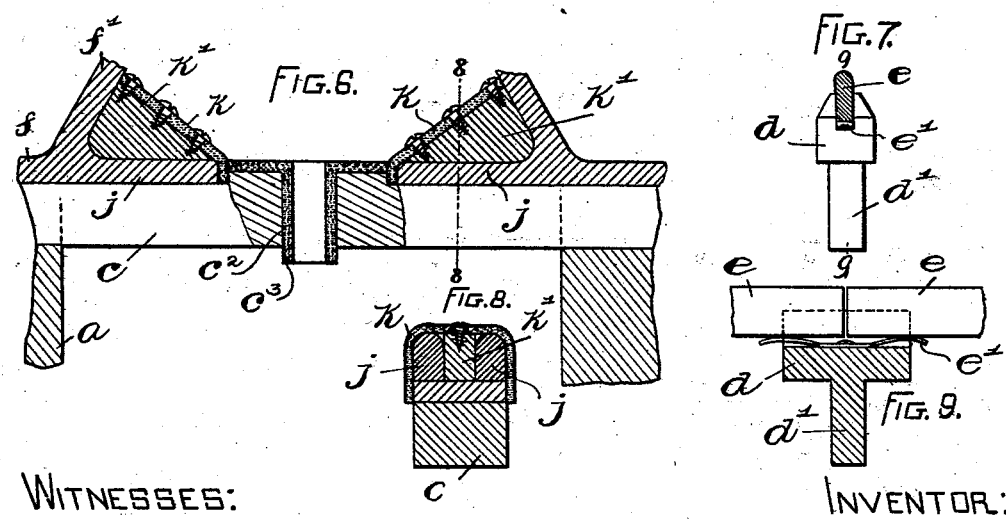
WITNESSES:
A. D. Hanson.
P. Davis.
INVENTOR:
W. H. Swift
by Wright, Brown & Quimby
Attys.

UNITED STATES PATENT OFFICE.

WILLIAM H. SWIFT, OF BOSTON, MASSACHUSETTS, ASSIGNOR OF ONE-HALF TO JOHN H. McGRADY, OF SAME PLACE.

CONDUIT ELECTRIC RAILWAY.

SPECIFICATION forming part of Letters Patent No. 531,450, dated December 25, 1894.

Application filed April 27, 1894. Serial No. 509,267. (No model.)

*To all whom it may concern:*

Be it known that I, WILLIAM H. SWIFT, of Boston, in the county of Suffolk and State of Massachusetts, have invented certain new and useful Improvements in Underground Electric Railroads, of which the following is a specification.

This invention relates to electric railway systems employing an underground conduit for containing the conductor or feeder, and provisions for transmitting the current therefrom to the motor on the car.

The present invention has in view certain structural improvements calculated to make such a system entirely practical, and the accompanying drawings illustrate a construction embodying the invention, the details of which are hereinafter described, and the essential features recited in the appended claims.

Of the accompanying drawings—Figure 1 represents a cross-section of a road-bed and conduit, and also of a trolley device, constructed in accordance with the invention. Fig. 2 represents the conduit partly in side elevation and partly in longitudinal section, and also shows the trolley in elevation, and a scraper device. Fig. 3 shows a partial plan view and partial section of the conduit. Fig. 4 shows the trolley on an enlarged scale partly in elevation and partly in section. Fig. 5 shows the trolley in vertical cross-section. Fig. 6 shows a sectional illustration of part of the conduit. Fig. 7 shows on an enlarged scale one of the chairs supporting the conductor-rail, and said rail in cross-section. Fig. 8 shows a section on line 8—8 of Fig. 6. Fig. 9 shows a section on line 9—9 of Fig. 7. Fig. 10 shows a cross-section of a portion of the conduit illustrating the action of a scraper.

In the drawings the letter, $a$, designates sub-masonry below the road-bed and forming a conduit whose bottom, $a'$, throughout level portions of the road is inclined in opposite directions, as shown in Fig. 2, so that water will flow down the same into cess-pools at the ends thereof. Flushing pipes as, $b$, in Fig. 1, enter the conduit at the high points of the conduit-bottom, said pipe having a T-head, $b'$, to turn the water in opposite directions over the inclined bottom. Beams, $c$, are embedded in the masonry and extend across the conduit, and said beams are formed with bifurcated ends, $c'$, projecting beyond the masonry and at the center with sockets, $c^2$, having insulating bushings, $c^3$. The beams, $c$, support chairs having bifurcated heads, $d$, resting on the beams with interposed insulation, and round shanks, $d'$, engaging the sockets, $c^2$. The current-conducting or feeding rail is supported by these chairs and is made up of sections in the form of flat bars, $e$, whose confronting ends rest in the bifurcation of the same chair as shown in Fig. 9. A flat spring, $e'$, is fastened on the bottom of the bifurcation and besides yieldingly supporting the rail-sections establishes and maintains electrical connection between them.

It will be observed that by the construction described any one of the rail-sections can be taken out readily, and the chairs are also readily removable.

The sub-masonry supports castings which are formed with base portions, $f$, resting on the masonry, and with converging upstanding portions, $f'$, whose upper parts form between them a slot, $f^2$, for the trolley-device hereinafter described. The upper portions of the castings which form the sides of the slot are thickened to increase their strength and wearing quality. The base portions, $f$, of the casting which rest on the masonry are formed with ears, $f^3$, which project over the bifurcated ends of the cross-beams, $c$, and are notched in their confronting edges to accommodate bolts, $f^4$, engaging the bifurcated ends of the beams and carrying nuts, $f^5$, which extend over the ears. In this manner the castings are securely fastened to the beams.

Castings of the above description are arranged end to end throughout the line and where the ends of the upright portions, $f$, confront each other, ears, $g$, are formed and pins or bolts, $g'$, are supported by these ears. Tie-rods, $g^2$, embrace the said bolts at their inner ends and the outer ends of said rods pass through stringers, $h$, which support the track-rails, $i$, said outer ends being screw-threaded to receive nuts, $g^3$.

At the angles of the castings, knee-braces, $j$, are formed and extend inward over the cross-beams, $c$, the knee-braces of two adjacent sets of castings extending over the same cross-beam.

Insulating jackets, $k$, cover the knee-braces and in order to completely guard against short-circuiting through said knee-braces, the jackets, $k$, are fastened to wooden pieces, $k'$, inserted between the knee-braces.

The trolley device is of the following construction: A grooved roller, $m$, rests upon and traverses the rail, $e$, and said roller is carried in a forked head, $m'$, on the lower end of a flat, thin bar or blade, $m^2$, of steel or other suitable material, which blade extends up through the slot. A bifurcated head, $m^3$, fastened to the upper end of the said blade has a square shank, $m^4$, which engages a socket, $m^5$, depending from a rock-shaft, $m^6$, in bearings on the car-track. This manner of supporting the trolley permits free lateral oscillation of the same so as to accommodate itself to the curves in the slot. A spiral spring, $n$, is inserted in the socket, $m^5$, behind the shank, $m^4$, and keeps the trolley roller always in contact with the conductor-rail notwithstanding irregularities in the track, the shank, $m^4$, being free to slide in the socket, $m^5$. In running from an underground system to an overhead trolley system, when the roller, $m$, leaves the conductor-rail in the conduit, the trolley device falls away from the car, and no stop has to be made for detaching the device. The blade, $m^2$, is surrounded by a jacket, $o$, of insulating material, and to prevent wearing away of said insulating jacket by contact with the sides of the slot, a metallic jacket, $o'$, is fitted over it throughout that portion which could encounter the sides of the slot.

Switches are provided for, as illustrated in Fig. 3, where $p$, designates a casting set in at a switch and having two or more divergent channels, $p'$, separated by a tapering switch-point, $p^2$. The sections, $q$, and $r$, of the through-rail and the switch rail enter different channels, as shown, and the connecting rail section, $e$, enters the opposite end of the casting. The motion of the car carries the trolley-roller off the section, $e$, of the conducting-rail, and the direction the car moves past the switch determines which of the channels, $p'$, the trolley-roller shall take and with which of the rails, $q$, or, $r$, it shall connect.

Means are shown for keeping the conducting rail and the slot clear of ice or other matter, such means being in the form of a scraper, which is designed to be carried by the plow which clears the track. Said scraper has a wide portion, $s$, to act on the top-surface of the castings, $f'$, and a reduced part, $s'$, passing down through the slot and whose side edges traverse the sides of the slot, and whose bottom edge traverses the conducting-rail.

The invention is not limited to any of the details of construction hereinbefore enumerated, but is capable of embodiment in other forms.

Having thus described my invention, what I claim as new, and desire to secure by Letters Patent, is—

1. In an underground electric-railway, sub-masonry inclosing a conduit, beams extending across said conduit and supported on the sub-masonry and having bifurcated ends projecting beyond the same, castings forming the entrance slot for the trolley and supported on the sub-masonry and cross-beams, said castings being in sections fitted together end to end and having ears extending over the bifurcated ends of the beams and notched in their confronting edges, and bolts engaging said bifurcated beam ends and the casting-ears, substantially as described.

2. In an underground electric-railway, sub-masonry inclosing a conduit, cross-beams supported by said sub-masonry and extending across the conduit, and castings forming the entrance slot for the trolley and supported on the sub-masonry and cross-beams and secured to the latter, said castings having inward-extending knee-braces resting on the cross-beams.

3. In an underground railway, sub-masonry inclosing a conduit, beams extending across said conduit and having centrally located sockets, chairs fitting said sockets, a conductor-rail supported by said chairs, and castings forming an entrance for the trolley.

4. In an underground railway, sub-masonry inclosing a conduit, beams extending across said conduit, chairs on said beams, a conductor-rail supported by said chairs, castings forming the entrance-slot for the trolley and having knee-braces extending inwardly over the cross-beams, said castings being in sections fitted together end to end, and insulating coverings over the knee-braces.

5. In an underground electric railway, beams extending across the conduit and having vertically extending sockets, chairs resting on said beams and having shanks engaging the sockets, and a conducting-rail resting on said chairs.

6. In an underground electric-railway, beams extending across the conduit, chairs supported on said beams, a conducting-rail supported by said chairs and made in sections whose confronting ends rest in the said chairs, and springs yieldingly supporting and electrically connecting the rail-sections.

7. In an underground electric-railway system, the combination of a socket pendent from the car, a trolley device having a stem at its upper end fitted to slide in said socket, a spring in the socket back of the said stem, and a conductor-rail for the trolley.

8. In an underground electric-railway system, the combination of a socket pivoted to the car and depending therefrom a trolley device having a stem at its upper end fitting said socket, a spring back of said stem, and a conductor-rail for the trolley.

In testimony whereof I have signed my name to this specification, in the presence of two subscribing witnesses, this 18th day of April, A. D. 1894.

W. H. SWIFT.

Witnesses:
A. D. HARRISON,
F. P. DAVIS.